United States Patent

Karnopp

[11] Patent Number: 5,205,371
[45] Date of Patent: Apr. 27, 1993

[54] MOTOR-DRIVEN SERVO STEERING SYSTEM

[75] Inventor: Dean Karnopp, Davis, Calif.

[73] Assignee: Robert Bosch GmbH, Gerlingen-Schillerhohe, Fed. Rep. of Germany

[21] Appl. No.: 749,876

[22] Filed: Aug. 26, 1991

[30] Foreign Application Priority Data

Oct. 4, 1990 [DE] Fed. Rep. of Germany ....... 4031316

[51] Int. Cl.$^5$ .............................................. B62D 5/06
[52] U.S. Cl. .................................. 180/79.1; 180/133; 364/424.05
[58] Field of Search .............................. 180/79.1, 133; 364/424.05

[56] References Cited

U.S. PATENT DOCUMENTS

| | | | |
|---|---|---|---|
| 3,831,701 | 8/1974 | Pilon et al. | 180/133 |
| 4,819,170 | 4/1989 | Shimizu | 364/924.05 |
| 4,932,492 | 6/1990 | Sauageot et al. | 180/79.1 |
| 4,986,381 | 1/1991 | Morishita et al. | 180/79.1 |
| 4,987,964 | 1/1991 | Tabuse | 180/79.1 |
| 5,010,970 | 4/1991 | Yamamoto | 180/79.1 |
| 5,016,740 | 5/1991 | Ito et al. | 180/79.1 |
| 5,078,225 | 1/1992 | Ohmura et al. | 180/79.1 |

FOREIGN PATENT DOCUMENTS 3919990 12/1989 Fed. Rep. of Germany.
1414206 11/1975 United Kingdom.

Primary Examiner—Mitchell J. Hill
Attorney, Agent, or Firm—Baker & Daniels

[57] ABSTRACT

The present invention is a motor-driven servo steering system for a motor vehicle having an actuator for superimposing steering intervention on the steering wheel power applied by the driver. Power provided by a power supply, for example an electric motor, is superimposed on the steering wheel power applied by the driver and thereby aids and boosts the steering wheel power. In addition to or instead of the boosting effect, the steering systems of the vehicle can be acted upon through steering signals that increase the road safety and/or the travel comfort. Because the system is responsive to steering wheel velocity, the system has a high inherent safety, where in case of power supply failure the driver has a direct mechanical access to the steering systems, without increasing the steering wheel torque required to be applied by the driver.

15 Claims, 3 Drawing Sheets

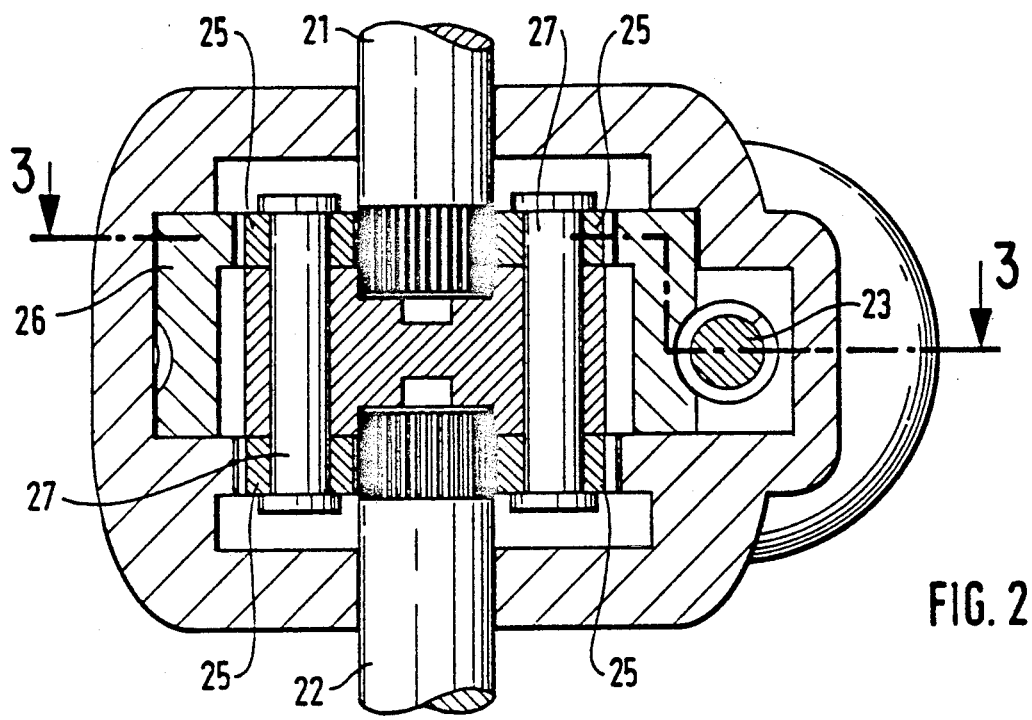
FIG. 2
FIG. 3
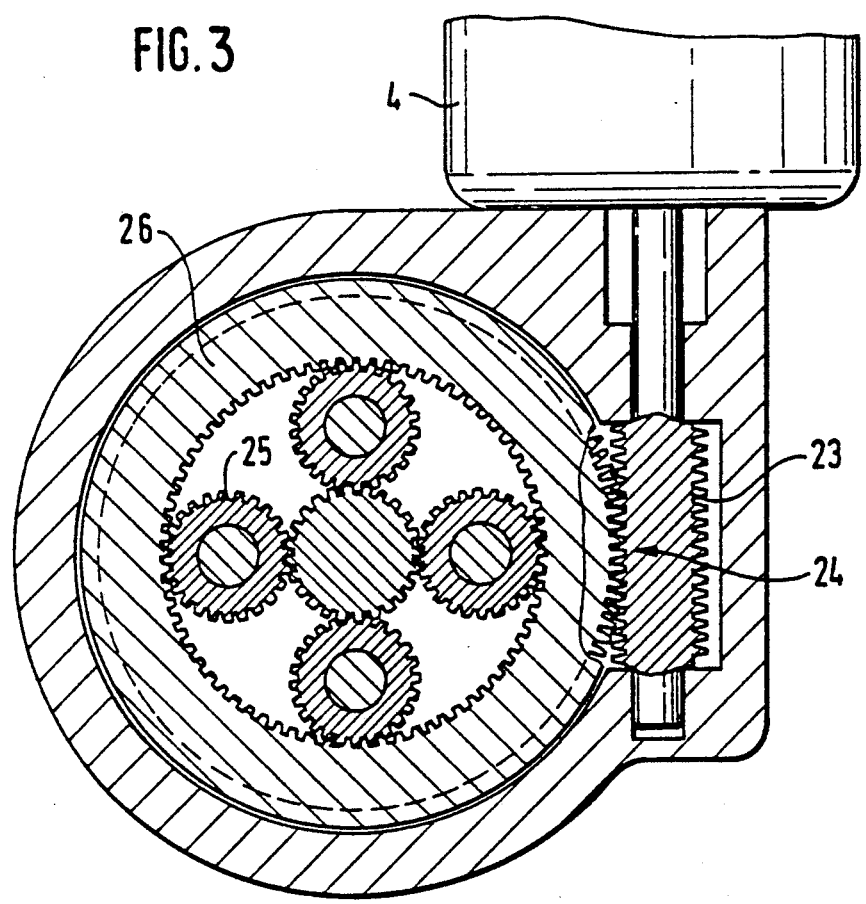

MOTOR-DRIVEN SERVO STEERING SYSTEM

BACKGROUND OF THE INVENTION

The invention concerns a motor-driven servo steering system for a motor vehicle.

Prior art vehicles are known which are controlled through one or several steerable axles, wherein the driver transmits the desired directional change to the steerable wheels by actuation of the steering wheel. Typically, a hydraulically operated servo steering is currently used which supports or aids the steering force of the driver, especially with heavy vehicles.

Electric motors are also used for boosting the steering force of the driver, for example as described from the German patent disclosure 37 09 590. Compared to hydraulic systems, the use of electromotors for boosting the steering force enables in a simple way greater variation options. Advantageously, the degree of steering boosting is selected depending on the traveling speed of the vehicle.

Besides transmitting the steering desired by the driver, the vehicle steering systems may also be affected so that an increase in road stability is achieved. Specifically, rolling and pitching motions of the vehicle may be minimized by steering motions. For that purpose, the movements of the vehicle are monitored by various sensors, and the information on the vehicle movement picked up from the sensors are processed by a computer. According to these signals, the steering systems of the vehicle are actuated to improve the vehicle's ability to handle the road, i.e., road stability.

To increase the road stability of a vehicle it is thus necessary to combine the desired steering with the steering instructions of a computer system monitoring the vehicle movements. The turning angle of the steerable wheels is defined as the sum of two angles. The one angle is determined by the driver by means of actuation of a steering wheel, while the other angle is chosen by the computer system monitoring the vehicle movements.

In the German patent disclosure 39 19 990, a hydraulic system aids the steering force of the driver. In addition to the hydraulic system, the steering instructions that depend on travel movements are caused by an electric motor. In a conventionally designed system aiding the steering force of the driver, as described in the German patent disclosure 37 09 590, there is always a fixed ratio given between the angle of the steering wheel actuated by the driver and the steering angle of the steerable wheel. Additionally in the system of the German patent disclosure 39 19 990, a turning of the steerable wheels is to a limited extent possible independently of the turning angle of the steering wheel actuated by the driver.

The system of the German patent document 39 19 990 has essentially two disadvantages:

1. The steerable wheels can only to a limited extent be selected independently of the turning of the steering wheel actuated by the driver for increasing the road stability.

2. This steering system requires two power sources, namely a hydraulic system for the driver and an electric motor for the computer.

British patent document 1 414 206 discloses a servo steering system wherein the steering force of the driver is aided by a hydraulic system and where an angular velocity of an electric motor is superimposed on the steering wheel angular velocity. The electric motor is controlled by an auxiliary system that senses vehicle movements such as lateral forces caused by side winds. However this system also requires two power sources.

What is needed is an optimized steering system with high inherent safety.

SUMMARY OF THE INVENTION

The present invention involves a servo steering system wherein the steering angles of the steerable wheels are not at a fixed ratio to the turning angle of the driver's steering wheel. The servo steering system provides a steering aid for the driver that operates according to the velocity of the steering wheel. Additionally, there are vast possibilities of variation given to apply additional steering signals on the steering systems.

For instance, the steering systems may include steering signals responsive to the movements of the vehicle body, in order to improve road safety and/or travel comfort.

The present invention also supports or aids the steering power applied by the driver, and the amount of aid may depend on variables representing the road stability of the vehicle.

Another advantage of the present invention is that a single electric motor is used both for steering aid of the driver and for influencing the vehicle movements.

In conventional systems which aid the steering force of the driver, the driver must exert a greater steering force in case of system failure. The servo steering system of the present invention provides a high inherent safety, so that the driver is not required to exert a greater steering force in order to steer the vehicle in case of standstill of the electric motor. Only the steering wheel angle of the driver-operated steering wheel needs to be increased in case of failure of the electric motor, in order to obtain a specific steering position of the wheels.

The servo steering system responds to the velocity of the steering wheel, whereas the conventional systems that aid the steering force of the driver are force-boosting systems. This constitutes an essential difference regarding safety in case of power supply failure. If a force-boosting power supply fails, the steering force of the driver must be increased. In contrast, if the power supply of a speed-responsive system fails, only the ratio between the steering angle of the steering wheel actuated by the driver and the steering angle of the steerable wheels changes.

The following will briefly address the essential differences of a force-boosting system, for one, and of a speed-boosting system for another.

In a force-boosting system, the steering power delivered by the driver is $$P1 = M1 \cdot w1$$

where M1 is the steering wheel moment and w1 the angular velocity of the steering wheel actuated by the driver.

The output power P3 of the force-boosting system amounts to $$P3 = M3 \cdot w3$$

where M3 represents the output torque and w3 the output angular velocity of the system.

The force acting to aid the driver's steering is provided by a power P2 supplied to the system, which is given as $$P2 = M2 \cdot w2$$

The angular velocities are equal in these systems.

$$w1 = w2 = w3$$

The torques are superimposed in additive fashion $$M3 = M1 + M2$$

so that the power is additive as well $$P3 = P1 + P2$$

In the case of velocity-boosting systems the torques are equal in the simplest case (gear ratio 1:1)

$$M3 = M2 = M1$$

while the angular velocities are additively superimposed $$w3 = w1 + w2$$

so that for the output power P3 there is given $$P3 = P1 + P2$$

In both cases, in the case of a force-boosting system and in the case of a velocity-boosting system, the steering power P1 applied by the driver and the power P2 provided by the power supply additively combine to provide the output power P3.

The inventional system aids the steering of the driver in a velocity responsive fashion. That is, the angular velocity of the steering wheel produced by the driver is increased by superimposition of the angular velocity of a power supply, for instance of an electric motor. In addition to aiding the steering power of the driver, the same power supply causes the superimposition of steering angle signals that contribute to increasing the road stability and/or the travel comfort.

Furthermore, the system of the present invention may be used either only to aid the driver's operation of the steering wheel or only for the imposition of the steering wheel power of the driver through steering signals that increase the road stability and/or the travel comfort.

The servo system of the present invention provides three easily identified advantages:

1. Control or regulation (open- or closed-loop) of the road stability and/or the travel comfort by imposition upon the steerable wheels, which additionally are influenced by the driver.

2. Aid and support for the steering power of the driver.

3. A high inherent safety through a mechanical connection between the steering wheel actuated by the driver and the steerable wheels in case of power supply(s) failure.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2 is a cross sectional view of an actuator of the servo steering system.

FIG. 3 is a sectional view taken along line 3—3 shown in FIG. 2.

Figure 1:
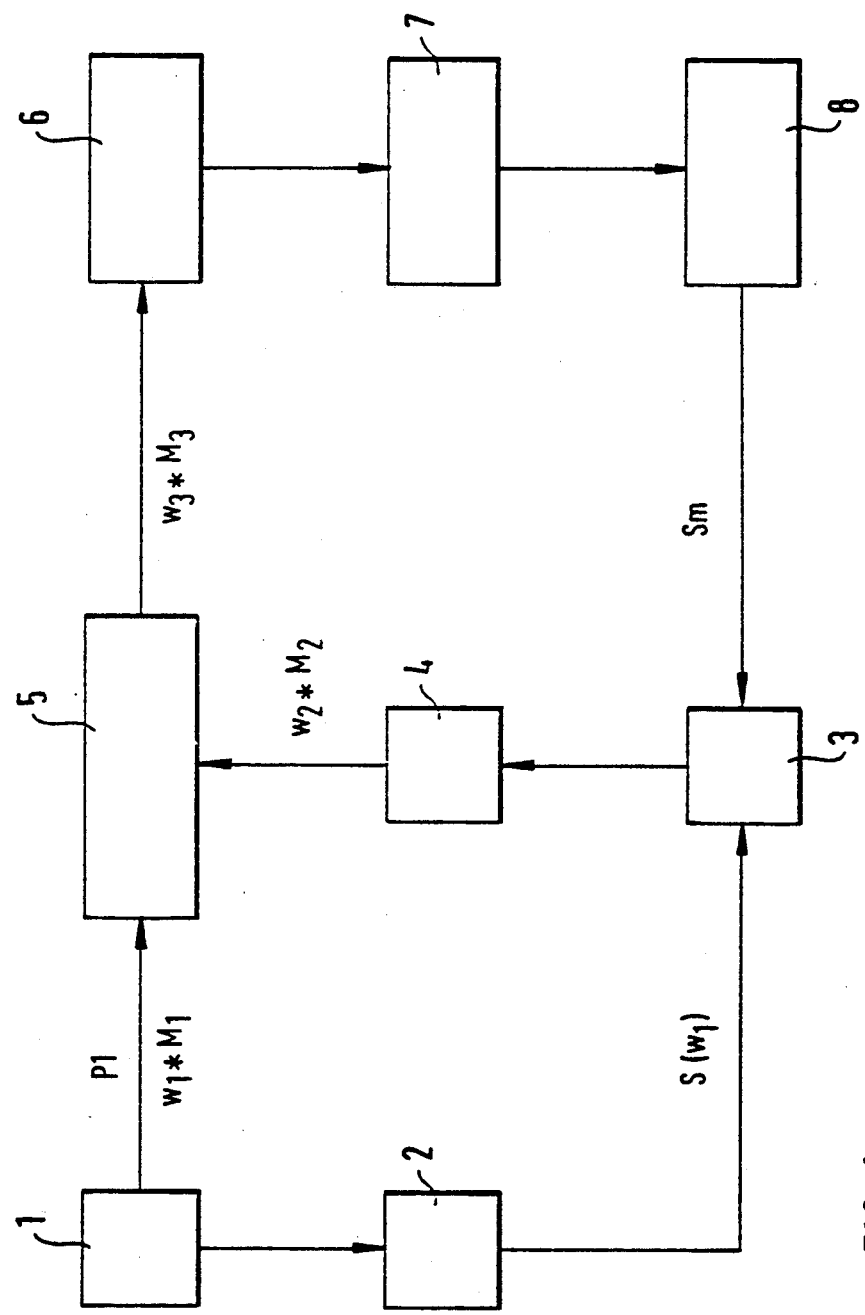
FIG. 1 shows a schematic diagram of the servo steering system of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

In FIG. 1, a schematic diagram of the servo steering system is shown having steering wheel 1 and means 2 for capturing the angular velocity of the steering wheel. Also, the servo system includes controller 3 serving to activate electric motor 4, actuator 5, and steering system 6 of the vehicle. Also shown in FIG. 1 is vehicle 7 which is to be steered and means 8 for monitoring the vehicle movements.

By actuation of steering wheel 1 by steering wheel moment M1 which is applied by the driver, the steering wheel receives angular velocity w1. The resulting steering wheel power P1=M1·w1 acts on the first input shaft of actuator 5. Acting on the second input shaft of actuator 5 is output power P2 of electric motor 4, where P2=M2·w2 with M2 representing the output torque and w2 representing the output angular velocity of the electric motor. The output shaft of actuator 5 provides output power P3=m3·w3, where M3 is the output torque and w3 the output angular velocity of actuator 5.

Actuator 5 is designed to operate so that an additive superimposition of the input powers P1 and P2 occurs, with the output angular velocity being:

$$w3 = g13 \cdot w1 + g23 \cdot w2 \qquad (1),$$

where the variables g13 and g23 are the gearing ratios of actuator 5. To better understand the invention, frictional losses in actuator 5 are not accounted for. The torques M1 and M2 acting on the input shafts meet the equations:

$$M1 = g13 \cdot M3 \text{ and } M2 = g23 \cdot M3 \qquad (2).$$

Combining the equations (1) and (2), the desired output power is shown to be:

$$p3 = p1 + p2 \qquad (2a).$$

As described below, actuator 5 additively superimposes the input angular velocities on an output angular velocity, whereas the torques are equal except for gear ratios to be selected. Thus, actuator 5 operates similarly to a mechanical differential gear.

If electric motor 4 fails for some reason, then w2=0, whereof follows with equation (1)

$$w3 = g13 \cdot w1 \qquad (3).$$

Equation (3) shows that in the case of a defect of electric motor 4, actuator 5 acts as a regular mechanical drive.

In the case of a defect of electric motor 4, according to equation (2), the ratio between the steering wheel moment M1 applied by the driver and the output torque M3 of actuator 5 amounts to:

$$g13 \cdot M3 = M1 \quad (4).$$

Equation (4) thus shows that the steering wheel torque which must be applied by the driver will not change if electric motor 4 fails.

Aiding the steering power applied by the driver P1 is accomplished by output angular velocity w2 of the electric motor being selected as:

$$w2 = \alpha \cdot w1 \quad (5).$$

The value $\alpha$ may be selected independently of variables representing the road stability, for instance independently of the vehicle speed so that $\alpha$ decreases as the vehicle speed increases. With such a value of $\alpha$ at high vehicle speeds the steering wheel power applied by the driver receives none or only a slight aid or support, whereas the steering power receives much aid at low vehicle speeds, for example in parking.

When substituting for w2 in Equation (1) from Equation (5), the following Equation results:

$$w3 = (g13 - g23 \cdot \alpha) \cdot w1 \quad (6).$$

From equation (6) it is evident that the ratio between the steering wheel actuated by the driver and the steerable wheels is changeable by the variable $\alpha$ (alpha), where the gearing ratios g13 and g23 of actuator 5 may be considered as constant. The output angular velocity w3 of actuator 5 becomes greater than the ratio of the steering wheel angular velocity w1 depending on the value of $\alpha$.

By substituting for g13 in Equation (6) from Equation (4), Equation (7) yields the ratio of the output power P3 of actuator 5 to the steering wheel power P1 as applied by the driver:

$$M3 \cdot w3 = ((g13 + g23 \cdot \alpha)/g13) \cdot M1 \cdot w1. \quad (7).$$

If $\alpha > 0$, the output power of actuator 5 is as follows:

$$P3 = M3 \cdot w3 \quad (8).$$

The output power P3, when $\alpha > 0$, is greater than the driver's steering wheel power which is as follows:

$$P1 = M1 \cdot w1 \quad (9).$$

If $\alpha = 0$, i.e., if the electric motor is at standstill, then the output power P3 is equal to the driver's steering wheel power P1, as:

$$P3 = M3 \cdot w3 = M1 \cdot w1 = P1 \quad (10).$$

In the case when the interventions in the steering by the output power P2 provided by electric motor 4 are to be performed for improvement of the vehicle movements in the sense of increased road safety and/or of the travel comfort, the output angular velocity w2 of the electric motor is selected as $$w2 = w2' \quad (11),$$

where w2' depends on signals Sm captured in means 8 for capturing the vehicle movements. The relationship of the output angular velocity w2' to the signals Sm is to be so selected that steering systems 6 which operationally are connected with the output shaft of actuator 5 are affected so that the improvement of the vehicle movements in the sense of increased road safety and/or travel comfort will be achieved.

To achieve steering interventions by the output power provided by electric motor 4 which aids the steering wheel power P1 applied by the driver and also provides improved road stability, the output angular velocity of electric motor 4 is selected as follows:

$$w2 = \alpha \cdot w1 + w2' \quad (12).$$

The output angular velocity w3 of actuator 5 thus becomes as follows:

$$w3 = ((g13 + g23 \cdot \alpha) \cdot w1) + g23 \cdot w2' \quad (13).$$

In this case the torque distribution remains the same as described by equations (2). The output power provided by electric motor 4 is controlled by controller 3. The signals Sm of means 8 for monitoring the vehicle motions and the signals S(w1) of means 2 for monitoring the steering wheel angular velocity are both transmitted to controller 3.

The steering wheel power P1 may be transmitted to actuator 5 through a universal joint connection. The output power of actuator 5 may be transmitted to the steerable wheels by means of joints having tie rods.

From the above explanations it is evident that in cases of failure of electric motor 4 the driver has to apply increased steering wheel power, whereas it is not necessary to increase the steering wheel torque. To achieve a certain turning angle of the steerable wheels in case of a defect of electric motor 4, the driver must increase the steering wheel velocity. The steering system will, in this case, appear to respond to the driver relatively slowly. Thus, in cases of failure of electric motor 4, the steering wheel power is increased by increasing the steering wheel velocity and not the steering wheel torque.

Figure 4:
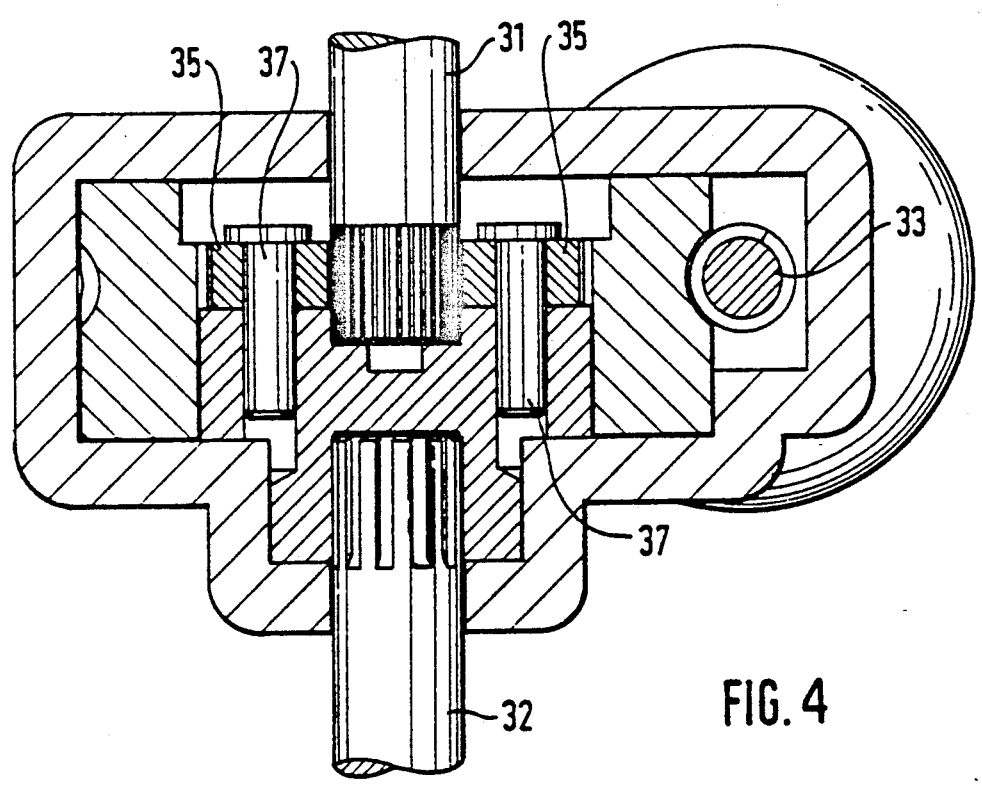
FIG. 4 is a cross sectional view of another embodiment of an actuator of the servo steering system.

FIGS. 2 and 3 depict an actuator for a superimposed steering intervention. FIG. 4 depicts another possible design of an actuator for superimposed steering intervention.

FIGS. 2 and 3 show sectional views through a possible embodiment of actuator drive 5. The actuator of FIGS. 2 and 3 includes first and second input shafts 21 and 23, respectively, output shaft 22, worm drive 24, ring gear 26, and axles 22 of planetary gears. Evident in FIGS. 2 and 3 are a first and a second planetary gear, with each of the two planetary gears comprising a sun wheel, a ring gear and planetary gears that are positioned between the sun wheel and the ring gear. First input shaft 21 receives the steering wheel power P1 applied by the driver. First input shaft 21 represents the axle of the sun wheel of the first planetary gear. The steering wheel power P1 applied by the driver acts to put planetary gears 25 of the first planetary gear drive in motion, the axles of which are connected with planetary gears 25 of a second planetary gear drive. Planetary gears 25, in turn, engage the sun wheel of the second planetary drive, the axle of which is output shaft 22. Ring gear 26 of the first planetary drive engages from outside, through worm gear 24, second input shaft 23. The output power P2 provided by electric motor 4 is received by second input shaft 23.

Worm gear 24 engages nonreversibly and from outside the ring gear 26 of the first planetary gear drive. This assures that no power will be transmitted to the second input shaft 23 in case of a defect of electric motor 4. The mechanical design of worm gear 24 is such that the worm can drive ring gear 26, but that the ring gear cannot transmit any power to worm gear 24.

Another design of actuator 5 is shown in FIG. 4. The actuator of FIG. 4 includes first and second input shafts 31 and 33, respectively, output shaft 32, planetary gears 35, and axles 37 of the planetary gears. Actuator 5 of FIG. 4 includes only a planetary drive comprising a sun wheel, a ring gear and planetary gears positioned between the sun wheel and the ring gear. First input shaft 31 permits the steering wheel power P1 applied by the driver to act on the axle of the sun wheel of the planetary drive. This acts to put the planetary gears 35 in motion, which are connected with output shaft 32. Second input shaft 33 engages by way of a worm drive, similarly to that in FIG. 3, from outside the ring gear of the planetary drive.

The difference between the embodiments of actuator 5 illustrated in FIGS. 2, 3 and 4 involves the access to the steerable wheels. The actuator of FIGS. 2 and 3 always provides a 1:1 gear ratio when the electric motor 4 comes to a standstill. In contrast, the actuator 5 of FIG. 4 provides the driver with direct mechanical access to the steerable wheels. Also, in the case of defects which cause electric motor 4 to be inoperative (i.e. when the output angular velocity w2 is zero), a self-locking clutch system or the like may be used to keep electric motor 4 at a standstill.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. Motor-driven servo steering system for a motor vehicle, said steering system comprising:

an actuator for superimposed steering intervention, said actuator including first means for transmitting first power by means of a first input shaft, with said first power having first torque and first angular velocity; second means for transmitting second power by a second input shaft, with said second power having second torque and second angular velocity; and third means for additively combining said first power and said second power to provide third power to an output shaft, said third power having third torque and third angular velocity, and said third power substantially equalling the sum of said first power and said second power disregarding frictional losses;

a steering system for the vehicle, said steering system being operably connected to said output shaft of said actuator;

a steering wheel for transmitting steering wheel power to said first input shaft of said actuator, said steering wheel power including steering wheel torque and steering wheel angular velocity;

an electric motor for providing output power to said second input shaft of said actuator, said electric motor controlled by a controller, said output power having output torque and output angular velocity;

means for monitoring said steering wheel angular velocity and providing angular velocity signals when said steering wheel is actuated by the driver; and means for transmitting said angular velocity signals to said controller.

2. The motor-driven servo steering system of claim 1 further comprising means for sensing the road stability of the vehicle and transmitting signals representing the sensed road stability to said controller.

3. The motor-driven servo steering system of claim 2 wherein said steering wheel power is boosted by said output power of said electric motor, said output power of said electric motor provided according to said signals representing the sensed road stability, with one condition sensed by said sensing means being the vehicle speed.

4. The motor-driven servo steering system of claim 2 wherein said actuator superimposes said steering wheel power on said output power of said electric motor whereby rolling or pitching motions of the vehicle monitored by said sensing means are minimized to thereby improve road stability and travel comfort.

5. The motor-driven servo steering system of claim 3 wherein said output power of said electric motor having a boosting component responsive to said steering wheel power and a stabilizing component responsive to said signals representative of the sensed road stability, and said actuator additively superimposes said steering wheel power and said boosting component on said stabilizing component whereby rolling or pitching motions of the vehicle monitored by said sensing means are minimized to thereby improve road safety and travel comfort.

6. The motor-driven servo steering system of claim 1 wherein said actuator superimposes said steering wheel power and said output power of said electric motor on said first and second input shafts by additively superimposing said steering wheel angular velocity and said output angular velocity on said third angular velocity of said actuator according to the equation:

$$w3 = g13 \cdot w1 + g23 \cdot w2,$$

with w3 representing said third angular velocity, g13 representing the transmission ratio of said first transmitting means, w1 representing said steering wheel angular velocity, g23 representing the transmission ratio of said second transmitting means, and w2 representing said output angular velocity, and said actuator also operating according to the equations:

$$M1 = g13 \cdot M3 \text{ and } M2 = g23 \cdot M13,$$

with M1 representing said steering wheel torque, M2 representing said output torque, and M3 representing said third torque, said actuator substantially operating according to said equations disregarding frictional losses.

7. The motor-driven servo steering system of claim 2 wherein said output angular velocity of said electric motor is provided according to the equation:

$$w2 = a \cdot w1,$$

with w2 representing said output angular velocity, $a$ representing a value dependent on said signals representative of the sensed road stability including signals representative of the vehicle speed, and w1 representing said steering wheel angular velocity which is determined by said controller according to said angular velocity signals.

8. The motor-driven servo steering system of claim 4 wherein said output angular velocity of said electric motor is provided according to the equation:

$$w2 = w2'$$

with w2 representing said output angular velocity and w2' representing a value dependent on said signals representative of the sensed road stability of the vehicle.

9. The motor-driven servo steering system of claim 5 wherein said output angular velocity of said electric motor is provided according to the equation:

$$w2 = a \cdot w1 + w2'$$

with w2 representing said output angular velocity, $a$ representing a value dependent on said signals representative of the sensed road stability including signals representative of the vehicle speed, w1 representing said steering wheel angular velocity which is determined by said controller according to said angular velocity signals, and w2' representing a value dependent on said signals representative of the sensed road stability of the vehicle.

10. The motor-driven servo steering system of claim 1 wherein said actuator includes at least one planetary gear.

11. The motor-driven servo steering system of claim 1 wherein each of said first and second transmitting means includes a sun wheel, a ring gear, and a plurality of planet wheels disposed between said sun wheel and said ring gear, with said first input shaft being connected to an axle of said sun wheel of said first transmitting means, said output shaft being connected to an axle of said sun wheel of said second transmitting means, said second input shaft engaging from outside of one of said first and second transmitting means, through a worm gear, said ring gear of said one transmitting means with said ring gear of said other transmitting means being held stationary, and each of said planet wheels including an axle and said axles being connected.

12. The motor-driven servo steering system of claim 1 wherein said actuator includes a planetary gear having a sun wheel, a ring gear, and a plurality of planet wheels disposed between said sun wheel and said ring gear, each of said planet wheels having an axle, said first input shaft being connected to an axle of said sun wheel, said output shaft being connected with said planet wheel axles, and said second input shaft engaging, through a worm gear, said ring gear of said planetary gear from outside said planetary gear.

13. The motor-driven servo steering system of claim 12 wherein said second input shaft engages said ring gear from outside said planetary gear by means of a nonreversible worm gear in said actuator.

14. The motor-driven servo steering system of claim 1 wherein said steering system operates on the front wheels of the vehicle.

15. A motor-driven servo steering system for a motor vehicle, said steering system comprising:
- an actuator including a first input shaft, a second input shaft, and an output shaft;
- a steering system operably connected with said output shaft;
- a steering wheel operably connected with said first input shaft;
- an electric motor having a controller, said electric motor operably connected with said second input shaft;
- means for monitoring the angular velocity of said steering wheel and providing steering wheel angular velocity signals when said steering wheel is actuated by the vehicle driver; and
- means for transmitting said angular velocity signals to said controller;
- said controller responsive to said angular velocity signals and operating said electric motor to provide power to said second input shaft, the amount of the power provided to said second input shaft depending on said angular velocity signals whereby said electric motor may aid said steering wheel independently of said first input shaft so that if said electric motor is inoperative, said steering wheel is still operatively connected to said steering system.

* * * * *